(12) United States Patent
Yochai et al.

(10) Patent No.: US 6,529,998 B1
(45) Date of Patent: Mar. 4, 2003

(54) ADAPTIVE PREFETCHING OF DATA FROM A DISK

(75) Inventors: Yechiel Yochai, Brookline, MA (US); Robert S. Mason, Uxbridge, MA (US)

(73) Assignee: EMC Corporation, Hopkinton, MA (US)

( * ) Notice: Subject to any disclaimer, the term of this patent is extended or adjusted under 35 U.S.C. 154(b) by 28 days.

(21) Appl. No.: 09/705,991

(22) Filed: Nov. 3, 2000

(51) Int. Cl.[7] .......................... G06F 12/00; G06F 12/16
(52) U.S. Cl. .................. 711/137; 711/207; 711/213
(58) Field of Search ........................ 711/137, 207, 711/213

(56) References Cited

U.S. PATENT DOCUMENTS 5,253,351 A * 10/1993 Yamamoto et al. ......... 395/425
5,495,591 A * 2/1996 Ryan ....................... 395/421.03
5,649,153 A * 7/1997 McNutt et al. ............. 395/445
6,003,114 A 12/1999 Bachmat .................... 711/113

* cited by examiner

*Primary Examiner*—Do Hyun Yoo
*Assistant Examiner*—Ngoc Dinh
(74) *Attorney, Agent, or Firm*—Fish & Richardson P.C.

(57) ABSTRACT

A method for adaptively selecting an optimal pre-fetch policy between a first pre-fetch policy, in which a request for desired data from a data-set is satisfied by reading the desired data, and a second pre-fetch policy, in which a request for desired data from a data-set is satisfied by reading the data-set. The method includes collecting statistics on a number of avoidable read-misses. On the basis of the statistics, a first threshold value is defined and frequently updated. Upon detection of an unavoidable read-miss, a random number is generated and the optimal pre-fetch policy is selected on the basis of a sign of a difference between the threshold value and the random number.

39 Claims, 9 Drawing Sheets

ADAPTIVE PREFETCHING OF DATA FROM A DISK

FIELD OF INVENTION

This invention relates to disk storage systems, and in particular, to the anticipation of a user's request for data from a disk.

BACKGROUND

A user who requires data from a disk initiates a complex and time-consuming sequence of events for retrieving that data. For example, in the course of retrieving that data, a disk controller must position a disk arm to align a read head with the cylinder on the disk that contains that data. The disk controller must then wait until the track containing the desired data begins passing under the read head. Then, when rotation of the disk finally brings the desired data under the read head, the disk controller must initiate the read operation. These events introduce considerable latency into the process of satisfying the user's request for data.

The latency associated with positioning the read head at the beginning of a track is analogous to a fixed cost in an economic transaction. Once the disk storage system has incurred the latency associated with placing the head at the beginning of a track, it costs only a little additional time to read the entire track rather than merely the desired data.

Although the marginal cost of reading an entire track is low compared to the fixed cost of positioning the disk arm at the beginning of the track, it is nevertheless preferable to avoid it when possible. In particular, when a disk storage system services multiple users who access multiple disks, the unnecessary transmission of entire tracks consumes considerable bandwidth and thereby significantly interferes with disk access operations of other users.

Whether or not to read an entire track, rather than merely the data specifically requested from that track is a decision that requires the disk storage system to anticipate whether additional data from that track is likely to be needed in the future. In a known method for doing so, the disk storage system maintains a global cache memory that is accessible to both a host computer and to a back-end processor in communication with a multiplicity of disks. The global cache memory is divided into logical volumes consisting of a large number of slots, each of which is sized to correspond to a physical track on a disk. Each track on a disk is assigned to a logical volume consisting of a large number of other tracks. Portions of some of these tracks may have already been copied into corresponding slots in the global cache memory. A disk storage system having the foregoing structure is described in Bachmat, U.S. Pat. No. 6,003,114, the contents of which are herein incorporated by reference.

Upon receiving a request for data, the disk storage system first checks to see if that data is already in a cache slot. If the data is already in a cache slot, the disk storage system retrieves the data directly from the cache slot. Such an event is referred to as a "read-hit." A read-hit is a desirable outcome because a read from the cache slot avoids latencies associated with reading from a physical disk drive.

In some cases, the disk storage system discovers that the desired data is not in the global cache memory at all. Instead, it resides on a disk. In this case, the disk storage system instructs a disk controller to retrieve the desired data from an appropriate track on a disk. Such an event is referred to as a "read-miss." A read-miss is an undesirable outcome because such an operation is afflicted with latencies associated with mechanical motion within the disk drive and possible latencies associated with data transmission between the global cache memory and the disk drive.

In response to a read-miss, a back-end processor fetches the desired data and transmits it to the global cache memory. If the back-end processor detects a second request for data from the same track within a selected interval, it responds by fetching the remainder of the track.

A disadvantage of the foregoing method is that each response to a read-miss assumes that no additional data from the track will be needed in the near future. It makes this assumption even though that prior requests for data from the logical volume containing that track may have consistently resulted in additional requests for data from the same logical volume.

SUMMARY

The method of the invention adaptively selects an optimal pre-fetch policy on the basis of the observed frequency of avoidable and unavoidable read-misses. As the relative frequencies of avoidable and unavoidable read-misses changes over time, the method of the invention causes the pre-fetch policy to switch between a first pre-fetch policy, in which a request for desired data from a data-set is satisfied by reading the desired data, and a second pre-fetch policy, in which a request for desired data from a data-set is satisfied by reading the data-set.

Upon the basis of statistics collected on the number of avoidable read-misses, a first threshold value is defined. When an unavoidable read-miss is detected, a random number is generated and compared with the threshold value. On the basis of a sign of a difference between the threshold value and the random number, the optimal pre-fetch policy is selected from the first and second pre-fetch policies.

The statistics for determining the frequency of avoidable read-misses are embodied in a random-walk variable whose value is updated in response to detection of an avoidable read-miss. The value of this random-walk variable is thus indicative of a likelihood of an avoidable read-miss. The value of the random-walk variable can also be updated in response to detection of an unavoidable read-miss.

The random-walk variable can be changed by determining a threshold read-miss probability at which the optimal pre-fetch policy transitions from the first pre-fetch policy to the second pre-fetch policy. The value of the random-walk variable is then changed by an amount that depends on the threshold read-miss probability.

The method can also include the step of classifying a read-miss as an avoidable-read miss or an unavoidable read-miss. This step can be performed by maintaining a flag associated with the data set, the value of which depends on whether or not data from that data set has previously been requested. This classification can be achieved by inspecting a flag associated with the data set, the flag being indicative of whether data from the data set has been previously requested. In the case of a distributed disk storage system made up of individual disk storage systems, the flag can also include information indicative of the identity of the system from which a request for data is made.

DETAILED DESCRIPTION

Figure 1:
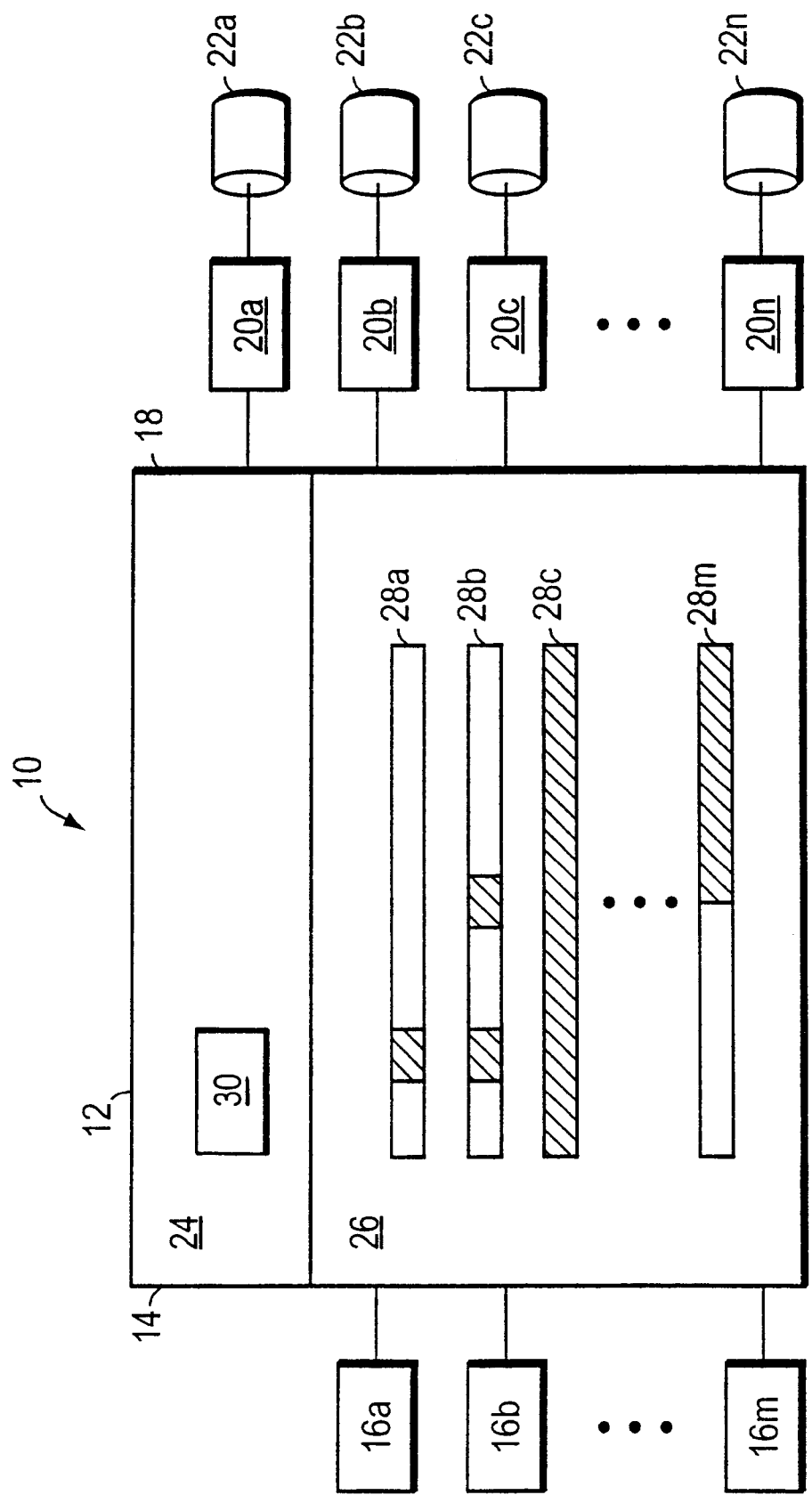
FIG. 1 shows a disk storage system having a plurality of disk controllers.

Referring to FIG. 1, a disk storage system 10 for carrying out the method of the invention includes a global memory 12 having a front-end 14 in communication with a plurality of host computers 16a–m, and a back-end 18 in communication with a plurality of disk controllers 20a–n, each of which controls the reading of data from corresponding logical volumes 22a–n. A logical volume 22a can include a large number of physical volumes under the control of that disk controller 20a. Alternatively, a logical volume 22a can include tracks from one or more physical volumes. The global memory 12 is partitioned into a control section 24 and a data section 26.

The data section 26 is partitioned into fixed-size slots 28a–m that are configured to accommodate tracks from logical volumes 22a–n. Some of these slots 28a, 28b contain copies of portions of data stored on corresponding tracks from corresponding logical volumes 22a, 22b. Others 28c contain a copy of an entire track from a corresponding logical volume. Still others 28m contain copies of data beginning with data from an intermediate section of a track from a corresponding logical volume 22n and ending with the end of the track.

The control section 24 includes a global-memory manager 30 and supporting information for managing the contents of the fixed-size slots 28a–m in the data section 26.

The global-memory manger 30 maintains images of frequently-accessed data from the various disks 22a–n in the fixed-size slots 28a–m. This frequently-accessed data is thus readily available for access by a host computer 16a. There also exists data that is not so frequently accessed. This data is stored in the logical volumes 22a–n but not in the global memory 12. The latency associated with accessing this data is thus greater than the latency associated with accessing data that is already in the global memory 12.

To service a request for data from a host computer 16a, the global-memory manager 30 first inspects the contents of global memory 12 to see if that data is already present. When this occurs, there are two possible outcomes: the data can be resident in the global memory 12, or the data can be resident on a physical disk drive but not in global memory 12.

If the data is resident in global memory 12, the global memory manager 30 fetches that data from the global memory 12. Such an event is referred to as a "read-hit."

If the data is not resident in global memory 12, the global-memory manager 30 sends a message to an appropriate disk controller 20a requesting that disk controller 20a to fetch the data from its logical volume 22a. Such an event is referred to as a "read-miss."

Because it is so much faster to read data from global memory 12, it is preferable that every request for data result in a read-hit. This can be achieved by simply making the global memory 12 large enough to mirror each logical volume 22a–n. Unfortunately, this approach is impractical because of the expense associated with having a global memory 12 of such magnitude.

Because global memory 12 typically lacks the capacity to mirror all data stored within the disks, it must be allocated so as to reduce the average latency associated with retrieving data from the disk storage system 10. This requires that all data stored in the disk storage system 10 be classified into two types: frequently accessed data that is resident in global memory 12, and infrequently accessed data that is not resident in global memory 12.

As time passes, the demand for frequently-accessed data may dwindle and the demand for infrequently-accessed data may surge. As a result, the process of classifying data as being frequently or infrequently accessed is preferably a dynamic one that will detect changes in the demand for data from a logical volume. The method of the invention provides a statistically-based process for carrying out this classification of data. To avoid consuming storage space in the global memory 12, the method of the invention is preferably carried out by a disk controller 20a.

Figure 2:
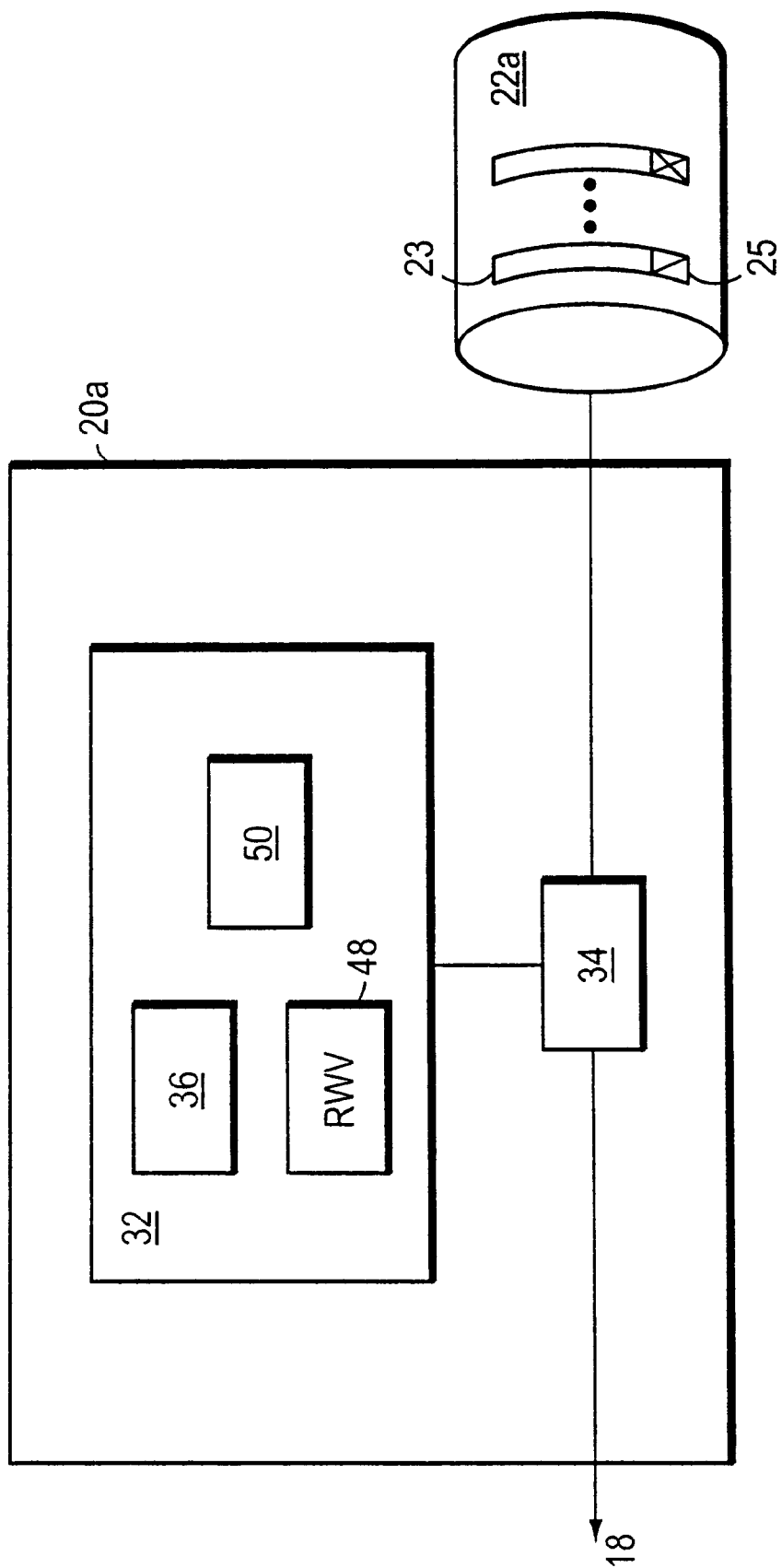
FIG. 2 shows a disk controller from the disk storage system in FIG. 1 in its operating mode.

Referring to FIG. 2, a disk controller 20a for carrying out the method of the invention includes a cache memory 32. The disk controller 20a further includes a back-end processor 34 that is in communication with the global memory 12, the cache memory 32, and the logical volume 22a.

Each track associated with a logical volume 22a is made up of a large number of blocks. Each block includes a flag that indicates whether that block has been copied into a cache slot in the global memory 12. As a result of this flag, whenever a read-miss results in a read request to the disk controller 20a, the disk controller 20a can classify that read-miss into one of two types: an avoidable read-miss and an unavoidable read-miss.

An avoidable read-miss of a track is one that could have been averted had the disk controller 20a pre-fetched the entire track, rather than merely the block containing the data requested at that time. Had it done so, the read-request that precipitated the readmiss could have been satisfied by fetching the desired data directly from the global memory 12 rather than from a physical drive.

The disk controller 20a classifies a read-miss as an "avoidable" read-miss when the distribution of flags on the track indicates that a previous portion of that track already exists in a cache slot. When the flag indicates that no previous portion of that track exists in a cache slot within the global memory 12, the disk controller 20a classifies that read-miss as an "unavoidable" read-miss. An excessive number of avoidable read-misses is an indication that the disk controller 20a should more frequently pre-fetch an entire track at a time. An excessive number of unavoidable read-misses is likewise an indication that the disk controller should respond to a request for data by fetching only that data rather than the entire track.

The numbers of avoidable and unavoidable read-misses can be used by the disk controller 20a to select between a first policy of fetching only the desired data and a second policy of fetching both the desired data and the remainder of the track containing the desired data. The selection between the first and second policies is based on the probability, as inferred from statistics collected by the disk controller 20a, that a read-miss will be an avoidable read-miss. The disk controller 20a selects the second policy when the probability of the foregoing event is above a policy-transition probability. Otherwise, the disk controller 20a selects the first policy.

Figure 3:
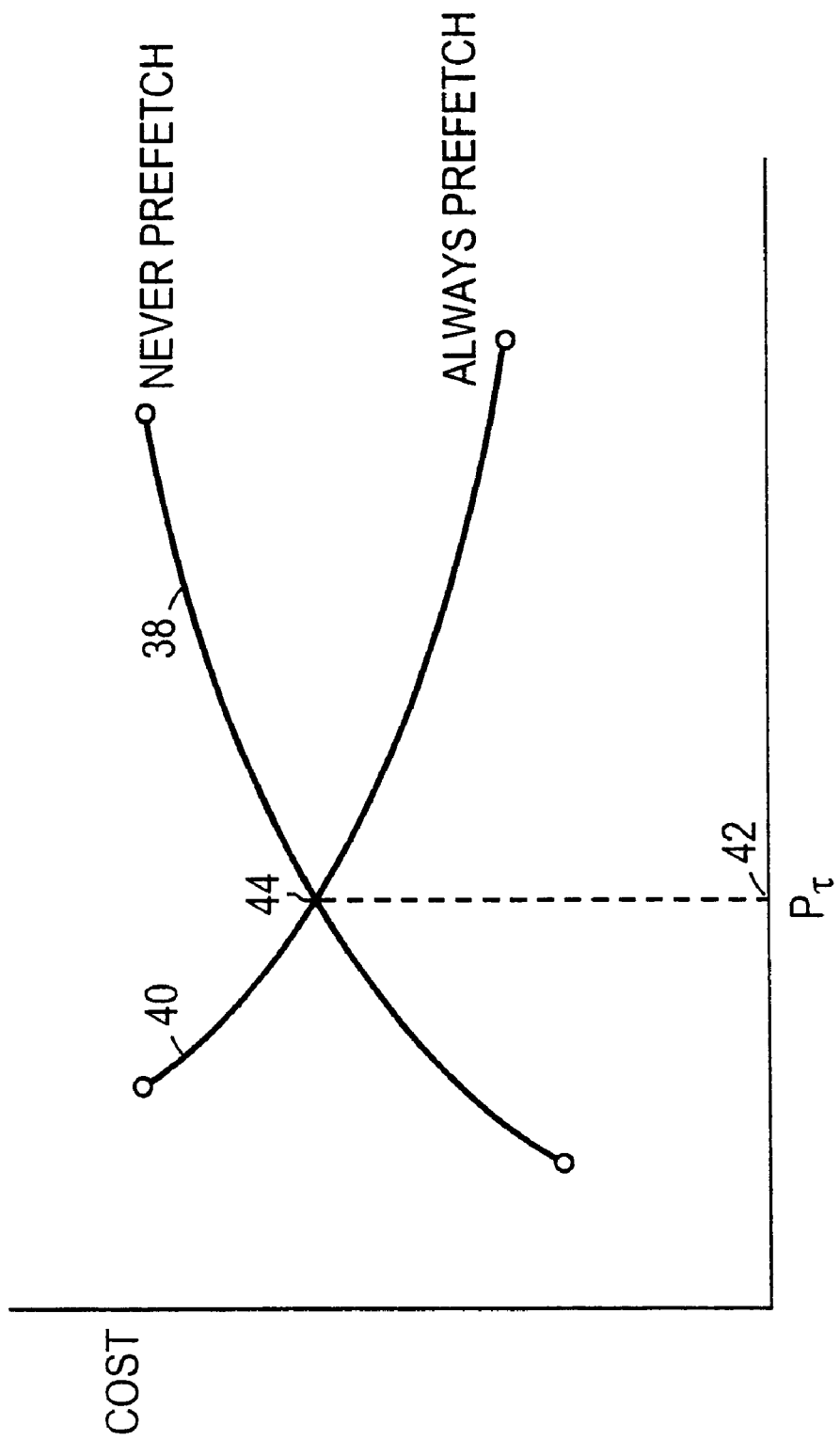
FIGS. 3–5 show cost functions illustrating the effect of mis-classifying a user.

The policy-transition probability for selecting between the first and second policies is the intersection of the two cost functions whose general form is as shown in FIG. 3. The vertical axis of FIG. 3 shows a cost, such as the latency associated with satisfying a request for data. The horizontal axis shows the probability that a read-miss will be an avoidable read-miss. The first curve 38 in FIG. 3 shows the cost of following a first policy in which the controller fetches only the data that the user has asked for. The second curve 40 shows the cost of following a second policy in which the controller fetches all the data in the track that contains the data that the user has asked for.

It is apparent from examining FIG. 3 that if most read-misses are unavoidable, the first policy is an optimal policy. As the likelihood of avoidable read-misses increases, the cost gap between the first and second policies decreases. Eventually, at the policy-transition probability 42, the first and second curves 38, 40 intersect, and the first policy ceases to be the optimal policy.

Figure 4:
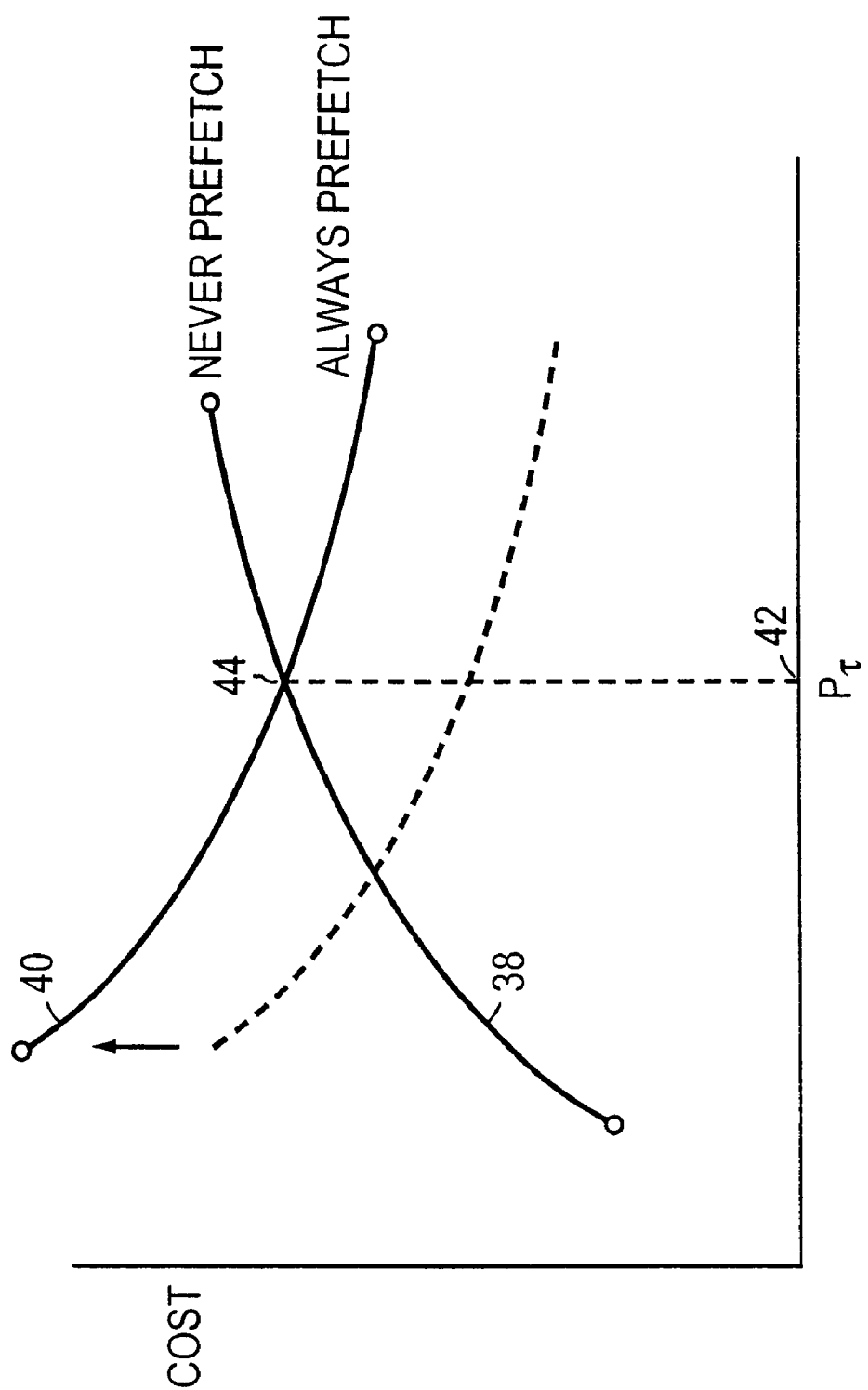
Figure 5:
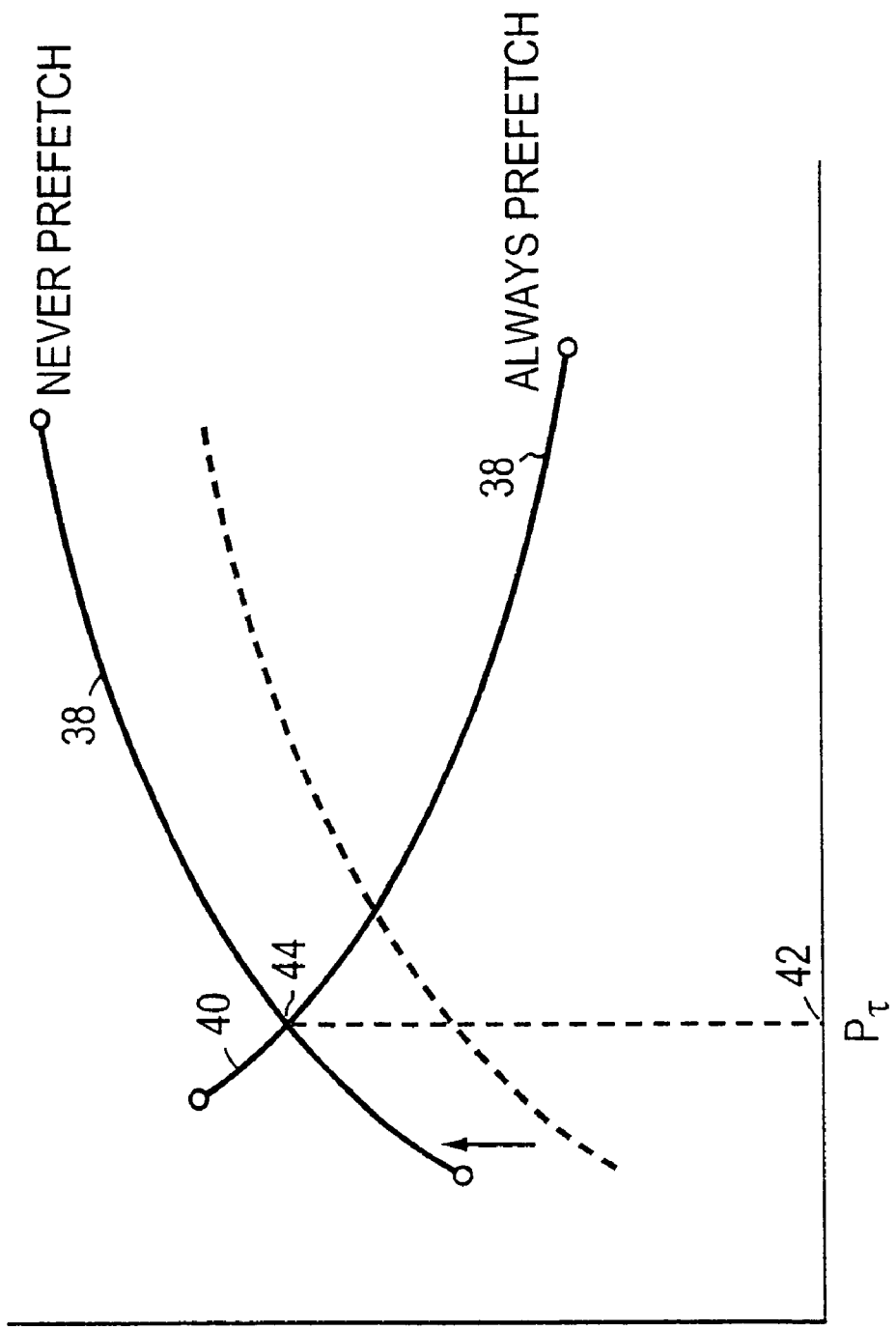

The form of the two cost functions, and hence the policy-transition probability 42 derived from their intersection, depends on the specific details of the disk storage system 10. For example, if the disk storage system 10 has very low bandwidth, the second curve 40 may be shifted upward thereby causing the intersection point 44 to shift to the right, as shown in FIG. 4. Or, if the disk storage system 10 uses disks with exceptionally sluggish arms, the first curve 38 may be shifted upward, thereby causing the intersection point 44 to shift to the left as shown in FIG. 5.

A difficulty with the foregoing method is that as time goes by, more and more tracks from the logical volume 22a will have been pre-fetched. As a result, the number of read-misses for reads to that logical volume 22a will decrease and the number of read-hits will increase. However, the disk controller 20a can only detect read-misses. The disk controller 20a cannot detect a read-hit because the satisfaction of a read request that results in a read-hit does not require its participation. As a result, the disk controller 20a will, after some time, be unable to maintain current statistics on the numbers of avoidable read-misses and unavoidable read-misses.

The inevitable obsolescence of the statistics maintained by the disk controller 20a can result in inefficient use of global memory. In particular, a disk controller 20a may continue to aggressively pre-fetch entire tracks from its associated logical volume 22a long after the demand for data from that logical volume 22a has dwindled. The disk controller 20a would follow this now sub-optimal policy because, with no new read-misses being detected, it would have no way of detecting any change in the number of avoidable read-misses the number of unavoidable read-misses. As a result, the disk controller 20a would have no basis for determining that what was once an optimal policy, namely the aggressive pre-fetching of entire tracks, has evolved into a sub-optimal policy that unnecessarily taxes the resources of the disk storage system 10.

Referring again to FIG. 2, the back-end processor 34 maintains the currency of its statistics by executing a monitoring process that detects read-misses and classifies them as being avoidable or unavoidable. The monitoring process then tracks observed relative frequencies of avoidable and unavoidable read-misses by maintaining a random-walk variable 48 in the disk controller's cache memory 32.

The random-walk variable 48 is typically an integer random variable whose value is between a lower bound and an upper bound, typically 0 and 255 respectively. For simplicity of notation, the random-walk variable is treated as being between 0 and 1. The random-walk variable 48 has an initial value, generally midway between its upper and lower bound. The monitoring process 36 changes the value of the random-walk variable 48 in response to the detection of avoidable and unavoidable read-misses. In addition, the back end processor executes a policy-selection process 50 that determines whether or not to pre-fetch a track. The monitoring process 36 and the policy-selection process 50 interact to execute instructions for carrying out the algorithm shown in FIG. 6.

Upon detection of a read-miss (step 52), the monitoring process classifies the read-miss as being an avoidable read-miss or an unavoidable read-miss (step 54). A read-miss for data from a particular track is classified as avoidable if the distribution of flags on that track indicates that a previous portion of that track is already resident in global memory 12. Otherwise, the read-miss is classified as unavoidable.

Figure 7:
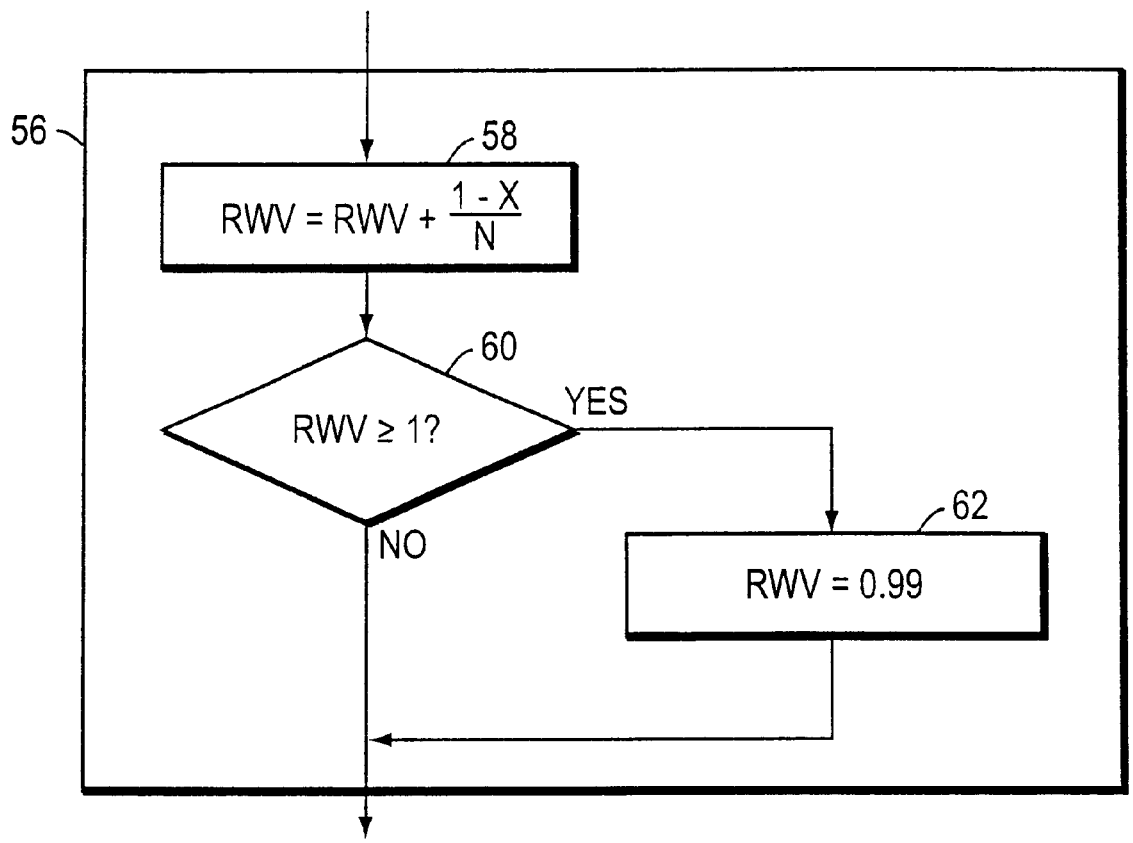
FIG. 7 shows the steps in incrementing the random-walk variable in FIG. 6.

If the data-collection process determines that the read-miss is an avoidable read-miss, it updates the random-walk variable (step 56), preferably in the manner shown in FIG. 7.

Referring now to FIG. 7, the monitoring process updates the random-walk variable by incrementing its value (step 58). The amount by which the random-walk variable is incremented depends on the policy-transition probability X and on a large integer N.

As part of updating the random-walk variable, the monitoring process checks to see if incrementing the random-walk variable would cause that variable to have a value equal to or in excess of its upper bound (step 60). If so, the monitoring process updates the random-walk variable by setting its value to be as close as possible to, but less than, its upper-bound (step 62). As will be apparent below, this ensures that the random-walk variable remains usable for determining whether or not to pre-fetch data from a track even after a long string of avoidable read-misses.

Figure 6:
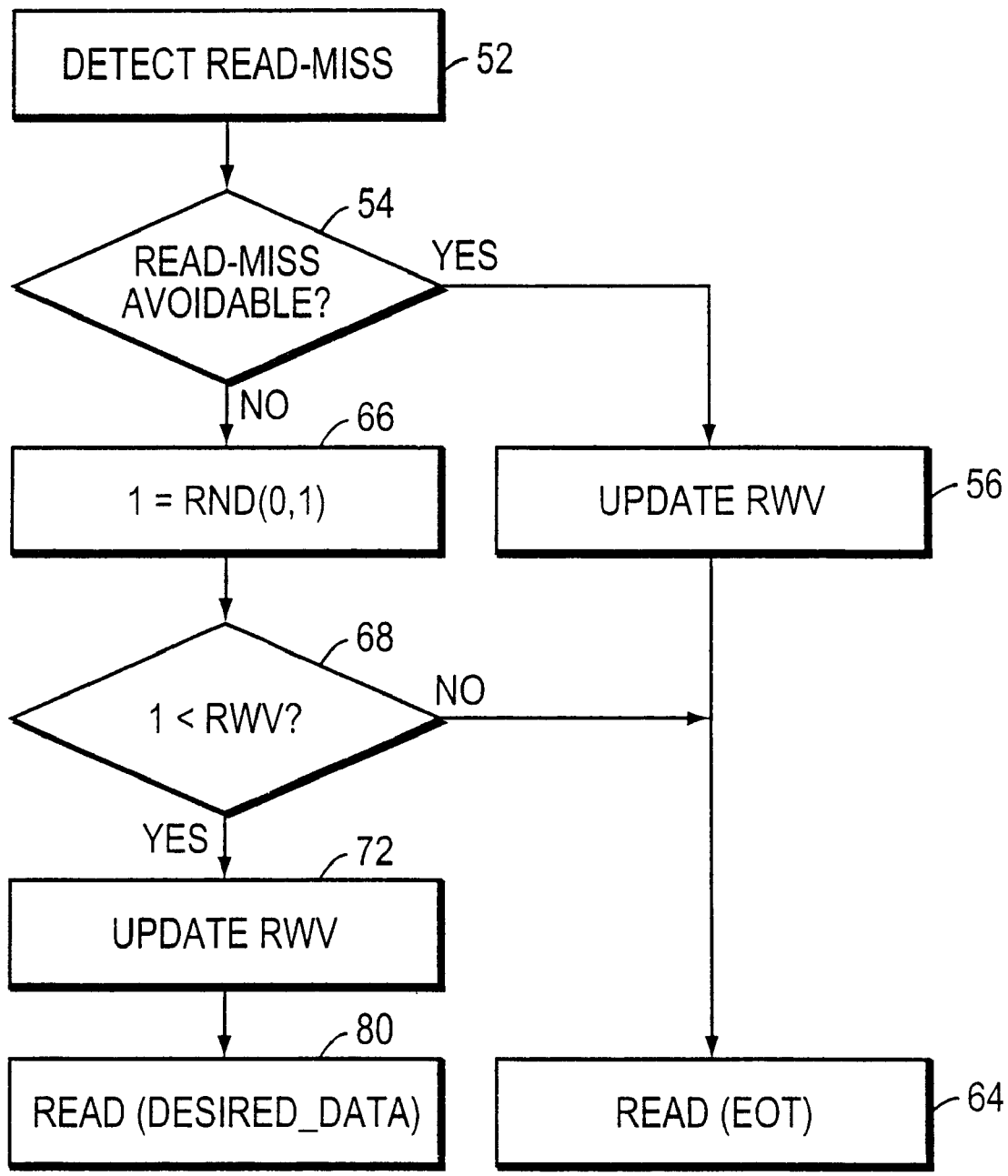
FIG. 6 shows a pre-fetching policy selection method according to the invention.

Referring back to FIG. 6, the policy-selection process responds to detection of an avoidable read-miss by causing the disk controller to fetch not only the desired data but all data remaining on the track that contains the desired data (step 64). Although FIG. 6 shows the step of fetching of data on the track (step 64) as following the step of updating the random-walk variable (step 56), it is understood that the since random-walk variable is incremented by such a small amount (step 58), it makes little practical difference which of these steps is executed first.

If the monitoring process determines that the detected read-miss is an unavoidable read-miss, it generates a uniformly distributed random variable having a value between the upper and lower bound of the random-walk variable (step 66). The monitoring process then compares the value of the random variable with that of the random-walk variable (step 68).

If the value of the random variable is greater than the value of the random-walk variable, then the policy-selection process causes the disk controller to fetch not only the desired data but all data remaining on the track that contains the desired data (step 64). Otherwise, the monitoring process updates the random-walk variable (step 72).

Figure 8:
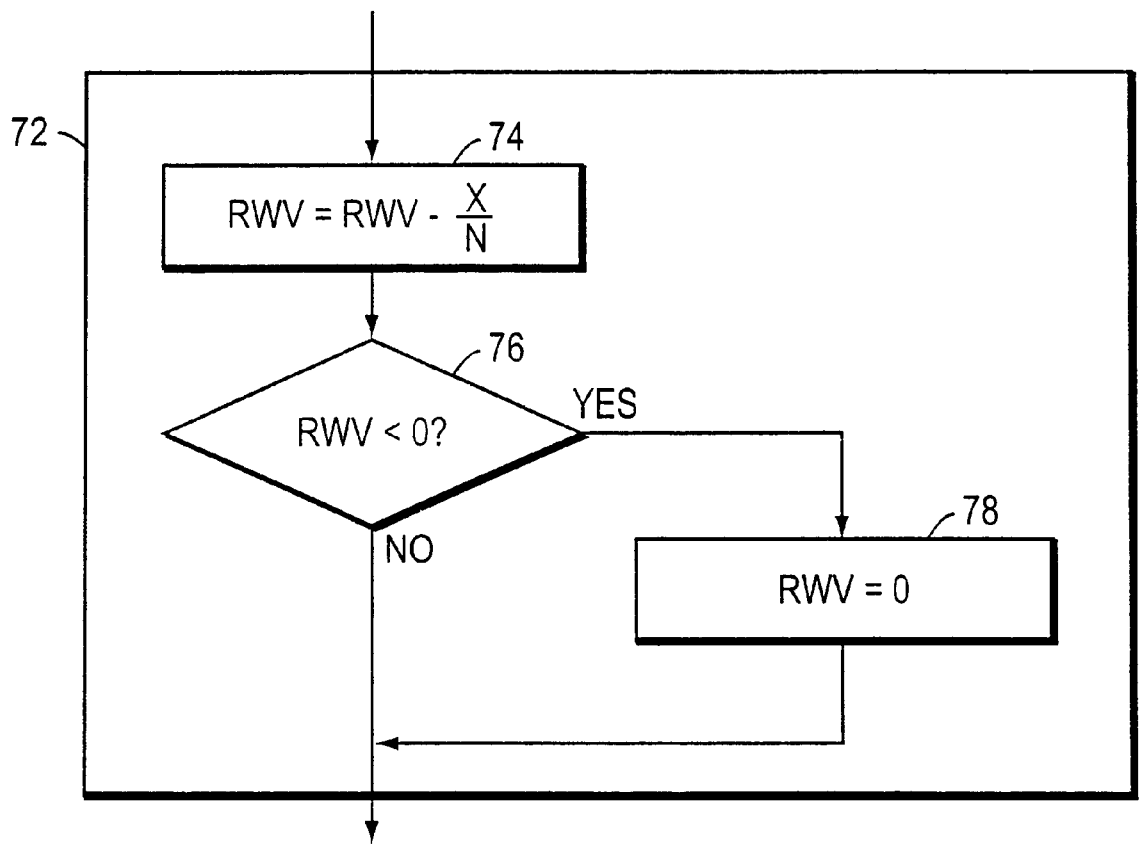
FIG. 8 shows the steps in decrementing the random-walk variable in FIG. 6.

Referring now to FIG. 8, the monitoring process updates the random-walk variable by decrementing its value (step 74). The amount by which the random-walk variable is decremented depends on the policy-transition probability X and on the large integer N referred to in FIG. 7.

As part of updating the random-walk variable, the monitoring process checks to see if decrementing the random-walk variable would cause that variable to have a value less than its lower bound (step 76). If so, the monitoring process updates the random-walk variable by setting its value to be equal to its lower-bound (step 78).

Referring back to FIG. 6, the policy-selection process responds to detection of an unavoidable read-miss by causing the disk controller to fetch only the desired data (step 80). Although FIG. 6 shows the step of fetching of data on the track (step 80) as following the step of updating the random-walk variable (step 72), it is understood that since the random-walk variable is incremented by only a small amount, it makes little practical difference which of these two steps is executed first two processes are independent of each other, these steps can be executed in any order or concurrently.

In the foregoing policy-selection method, when the probability of an avoidable read-miss is high, the value of the random-walk variable remains very close to 1. Conversely, when the probability of an unavoidable read-miss is low, the value of the random-walk variable remains very close to 0. When the optimal policy shifts from being one in which fetching only the desired data is preferable to one in which pre-fetching the entire track is preferable, the random-walk variable approaches 1 in about $(N/(1-X))^2$ steps. Conversely, when the optimal policy shifts from being one in which pre-fetching the entire track is preferable to one in which fetching only the desired data is preferable, the random-walk variable approaches 0 in about $(N/X)^2$ steps. The choice of N thus governs the sensitivity of the method to a shift in the optimal policy. N is thus chosen so that the data storage system has a desired sensitivity to changes in the optimal policy.

Figure 9:
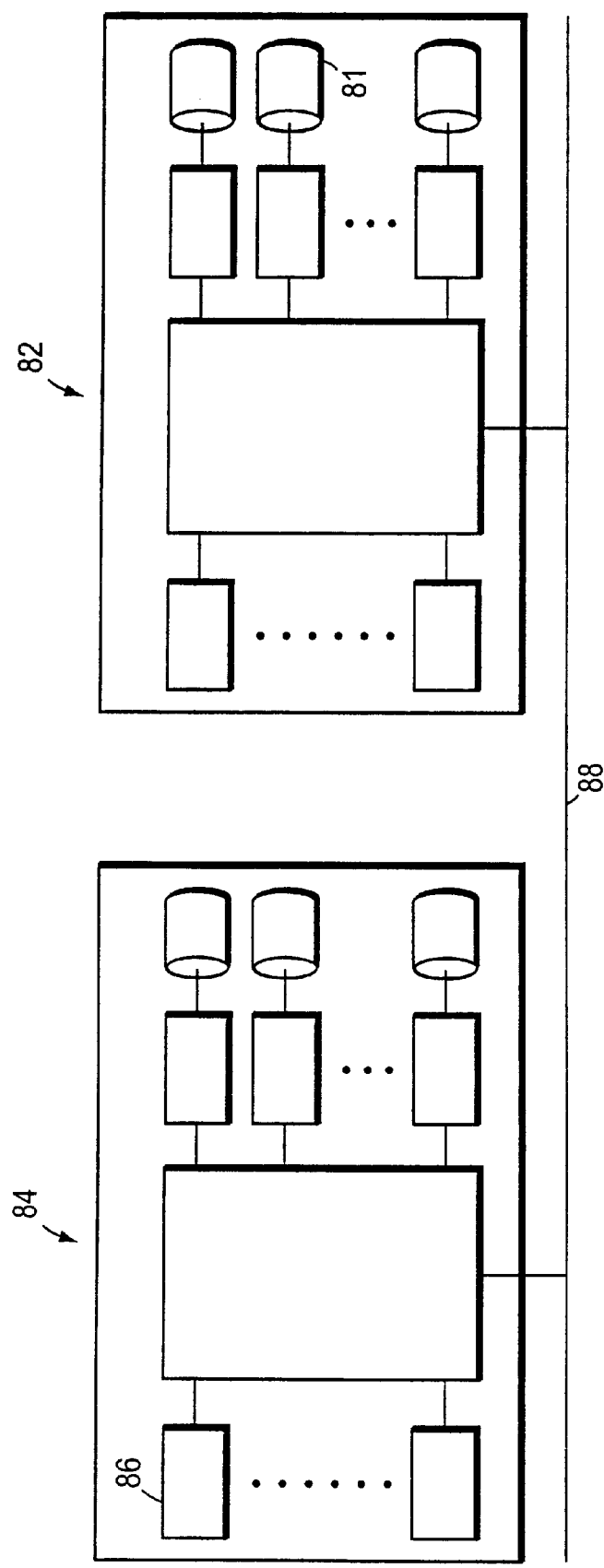
FIG. 9 shows a distributed disk storage system having at least two disk storage systems as shown in FIG. 1.

As shown in FIG. 9, the desired data can also be stored on a disk 81 associated with a second disk storage system 82 that is different from a first disk storage system 84 to which a host processor 86 requesting that data is connected. The first and second disk storage systems 82, 84 may be very far apart and connected only by an expensive and relatively narrow bandwidth communication channel 88.

The method of the invention is equally applicable to a configuration as shown in FIG. 9. In the case of the distributed system shown in FIG. 9, the cost functions of FIGS. 3–5 may need to be changed. Additionally, the flag will need to include information indicative of which disk storage systems 82, 84 have a cache slot that includes data copied from the track containing the desired data.

Having described the invention, and a preferred embodiment thereof, what we claim as new, and secured by Letters Patent, is:

1. A method for adaptively selecting an optimal pre-fetch policy between
   a first pre-fetch policy, in which a request for desired data from a data-set is satisfied by reading said desired data, and
   a second pre-fetch policy, in which a request for desired data from a data-set is satisfied by reading said data-set, said method comprising:
   collecting statistics on a number of avoidable read-misses;
   on the basis of said statistics, defining a first threshold value;
   upon detection of an unavoidable read-miss, generating a random number, and
   on the basis of a sign of a difference between said threshold value and said random number, selecting said optimal pre-fetch policy from said first and second pre-fetch policies.

2. The method of claim 1 further comprising selecting said data-set to include data from a track on a disk.

3. The method of claim 2 further wherein selecting said data-set to include data from a track on a disk comprises selecting said data from said track to include said desired data and data stored between said desired data and an end of said track.

4. The method of claim 1 wherein collecting statistics comprises maintaining a random-walk variable having a value indicative of a likelihood of an avoidable read-miss.

5. The method of claim 4 wherein maintaining said random-walk variable comprises changing said value of said random-walk variable in response to detection of an avoidable read-miss.

6. The method of claim 4 wherein maintaining said random-walk variable comprises changing said value of said random-walk variable in response to detection of an unavoidable read-miss.

7. The method of claim 5 wherein changing said value of said random-walk variable comprises:
   determining a threshold read-miss probability at which said optimal pre-fetch policy transitions from said first pre-fetch policy to said second pre-fetch policy;
   changing said value of said random-walk variable by an amount dependent on said threshold read-miss probability.

8. The method of claim 1 wherein generating a random number comprises generating a random number having a uniform probability distribution over an interval defined by an upper bound and a lower bound.

9. The method of claim 1 wherein collecting statistics comprises classifying a read-miss as an avoidable-read miss or an unavoidable read-miss.

10. The method of claim 9 wherein classifying a read-miss comprises inspecting a flag associated with said data-set, said flag being indicative of whether data from said data-set has been previously requested.

11. The method of claim 10 wherein inspecting said flag comprises determining an identity of a system requesting said data from said data-set.

12. A mass-storage system for providing desired data to at least one host computer, said mass-storage system comprising:
   a data-storage device having a data-set stored thereon, said data-set including said desired data;
   a controller in communication with said data-storage device, said controller including
     a memory element for storage of statistics indicative of a number of avoidable read-misses;
     a random-number generator for generating a random number in response to detection of an unavoidable read-miss;
     a processor in communication with said memory element and said random-number generator for selecting an optimal pre-fetch policy on the basis of a sign of a difference between a threshold value defined on the basis of said statistics and said random number, said optimal pre-fetch policy being selected from
       a first pre-fetch policy in which a request for desired data from a data-set is satisfied by reading said desired data, and
       a second pre-fetch policy in which a request for desired data from a data-set is satisfied by reading said data-set.

13. The mass-storage system of claim 12 wherein said data-set includes data from a track on a disk.

14. The mass-storage system of claim 12 wherein said statistics stored in said memory element comprise a random-walk variable having a value indicative of a likelihood of an avoidable read-miss.

15. The mass-storage system of claim 14 wherein said random-walk variable comprises a value that changes in response to detection of an avoidable read-miss.

16. The mass-storage system of claim 14 wherein said random-walk variable comprises a value that changes in response to detection of an unavoidable read-miss.

17. The mass-storage system of claim 15 wherein said value changes by an amount that depends on a threshold read-miss probability at which said optimal pre-fetch policy transitions from said first pre-fetch policy to said second pre-fetch policy.

18. The mass-storage system of claim 12 wherein said random-number generator comprises a uniform-distribution random-number generator for generating a random number having a uniform probability distribution over an interval defined by an upper bound and a lower bound.

19. The mass-storage system of claim 12 further comprising a classifier for distinguishing between an avoidable-read miss and an unavoidable read-miss.

20. The mass-storage system of claim 19 wherein said classifier includes a flag-inspector for determining, on the basis of the value of a flag associated with said data-set, whether data from said data set has been previously requested.

21. The mass-storage system of claim 20 wherein said classifier includes a flag-inspector for determining an identity of a system requesting said data from said data set.

22. A computer-readable medium having encoded thereon software for adaptively selecting an optimal pre-fetch policy between a first pre-fetch policy, in which a request for desired data from a data-set is satisfied by reading said desired data, and a second pre-fetch policy, in which a request for desired data from a data-set is satisfied by reading said data-set, said software including instructions for:
collecting statistics on a number of avoidable read-misses;
on the basis of said statistics, defining a first threshold value;
upon detection of an unavoidable read-miss, generating a random number, and
on the basis of a sign of a difference between said threshold value and said random number, selecting said optimal pre-fetch policy from said first and second pre-fetch policies.

23. A method for adaptively selecting an optimal pre-fetch policy between a first pre-fetch policy, in which a request for desired data from a data-set is satisfied by reading said desired data, and a second pre-fetch policy, in which a request for desired data from a dataset is satisfied by reading said data-set, said method comprising:
collecting statistics on a number of avoidable read-misses;
on the basis of said statistics, defining a first threshold value;
upon detection of an unavoidable read-miss, generating a random number, and
on the basis of a sign of a difference between said threshold value and said random number, selecting said optimal pre-fetch policy from said first and second pre-fetch policies.

24. The method of claim 23, wherein said statistics stored in said memory element comprise a random-walk variable having a value indicative of a likelihood of an avoidable read-miss and maintaining said random-walk variable comprises changing said value of said random-walk variable in response to detection of an unavoidable read-miss.

25. The method of claim 24, wherein changing said value of said random-walk variable comprises:
determining a threshold read-miss probability at which said optimal pre-fetch policy transitions from said first pre-fetch policy to said second pre-fetch policy;
changing said value of said random-walk variable by an amount dependent on said threshold read-miss probability.

26. A mass-storage system for providing desired data to at least one host computer, said mass-storage system comprising:
a data-storage device having a data-set stored thereon, said data-set including said desired data;
a controller in communication with said data-storage device, said controller including
a memory element for storage of statistics indicative of a number of avoidable read-misses;
a processor in communication with said memory element and said random number generator for selecting an optimal pre-fetch policy on the basis of said statistics, said optimal pre-fetch policy being selected from
a first pre-fetch- policy in which a request for desired data from a data-set is satisfied by reading said desired data, and
a second pre-fetch policy in which a request for desired data from a data-set is satisfied by reading said data-set.

27. The mass-storage system of claim 26,
wherein said controller further comprises a random-number generator for generating a random number in response to detection of an unavoidable read-miss, and
wherein said processor for selecting an optional pre-fetch policy on the basis of said statistics is a processor for selecting an optimal pre-fetch policy on the basis of a sign of a difference between a threshold value defined on the basis of said statistics and said random number.

28. The mass-storage system of claim 26, wherein said statistics stored in said memory element comprise a random-walk variable having a value indicative of a likelihood of an avoidable read-miss.

29. A computer-readable medium having encoded thereon software for adaptively selecting an optimal pre-fetch policy between a first pre-fetch policy, in which a request for desired data from a data-set is satisfied by reading said desired data, and a second pre-fetch policy, in which a request for desired data from a data-set is satisfied by reading said data-set, said software including instructions for:
collecting statistics on a number of avoidable read-misses;
on the basis of said statistics, defining a first threshold value;
upon detection of an unavoidable read-miss, generating a random number, and
on the basis of a sign of a difference between said threshold value and said random number, selecting said optimal pre-fetch policy from said first and second pre-fetch policies.

30. The computer-readable medium of claim 22 wherein said software further comprises instructions for selecting said data-set to include data from a track on a disk.

31. The computer-readable medium of claim 30 wherein said instructions for selecting said data-set to include data from a track on a disk comprise instructions for selecting said data from said track to include said desired data and data stored between said desired data and an end of said track.

32. The computer-readable medium of claim 22 wherein said instructions for collecting statistics comprise instructions for maintaining a random-walk variable having a value indicative of a likelihood of an avoidable read-miss.

33. The computer-readable medium of claim 32 wherein said instructions for maintaining said random-walk variable comprise instructions for changing said value of said random-walk variable in response to detection of an avoidable read-miss.

34. The computer-readable medium of claim 32 wherein said instructions for maintaining said random-walk variable comprise instructions for changing said value of said random-walk variable in response to detection of an unavoidable read-miss.

35. The computer-readable medium of claim 33 wherein said instructions for changing said value of said random-walk variable comprise instructions for:

determining a threshold read-miss probability at which said optimal pre-fetch policy transitions from said first pre-fetch policy to said second pre-fetch policy;

changing said value of said random-walk variable by an amount dependent on said threshold read-miss probability.

36. The computer-readable medium of claim 22 wherein said instructions for generating a random number comprise instructions for generating a random number having a uniform probability distribution over an interval defined by an upper bound and a lower bound.

37. The computer-readable medium of claim 22 wherein said instructions for collecting statistics comprise instructions for classifying a read-miss as an avoidable-read miss or an unavoidable read-miss.

38. The computer-readable medium of claim 37 wherein said instructions for classifying a read-miss comprise instructions for inspecting a flag associated with said data-set, said flag being indicative of whether data from said data-set has been previously requested.

39. The computer-readable medium of claim 38 wherein said instructions for inspecting said flag comprise instructions for determining an identity of a system requesting said data from said data-set.

\* \* \* \* \*